United States Patent Office 3,135,756
2-(4-PHENYLPIPERAZINYL)-1-PHENYLETHYL ACETATES
Seymour L. Shapiro, Hastings on Hudson, Louis Freedman, Bronxville, and Harold Soloway, New Rochelle, N.Y., assignors to U.S. Vitamin & Pharmaceutical Corporation, New York, N.Y., a corporation of Delaware
No Drawing. Filed May 17, 1961, Ser. No. 110,657
8 Claims. (Cl. 260—268)

This invention is concerned with 2-(4-phenylpiperazinyl)-1-phenylethyl acetate of the structure,

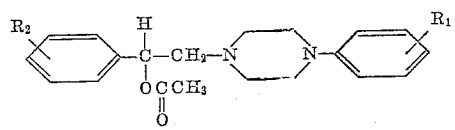

which are relatively non-toxic and show desirable bronchodilator properties in the absence of cardiovascular side effects.

While these compounds provide many unique structural distinctions relative to known bronchodilator agents, in particular, the acetate conveys unique and desirable properties, insofar as eliminating the sustained hypotension and other cardiovascular side-effects noted with underivatized free hydroxyl compounds.

The acetate derivatives of this application are distinguished by the fact that a variety of other derivatives of the alcoholic group such as the propionate, butyrate, benzoate, carbamate, and ethyl carbamate fail to provide the same desirable pharmacological response.

Compounds contemplated and indicated as within the scope of this invention are those wherein $R_2$ is hydrogen, halogen, lower alkyl and aryl, and wherein $R_1$ is selected from the group consisting of hydrogen, lower alkyl, lower alkoxy, and halogen.

The compounds of this invention are strong bases and by virtue of this property can form salts with the non-toxic mineral acids, typified by hydrochloric, hydrobromic, sulfuric acid, as well as salts of the organic acids, and the acidic xanthines. In addition, the acetate compounds can be quaternized with such agents as methyl-iodide, diethylsulfate, allyl bromide, and ethyl bromoacetate.

Since the acetoxy bearing carbon atom is asymmetric, there is also contemplated the individual d and l forms in addition to the dl racemate of the novel compounds of this invention.

The compounds may be prepared by condensation of the appropriately substituted phenylpiperazine with the requisite styrene oxide to yield the amino alcohol as shown in the equation below:

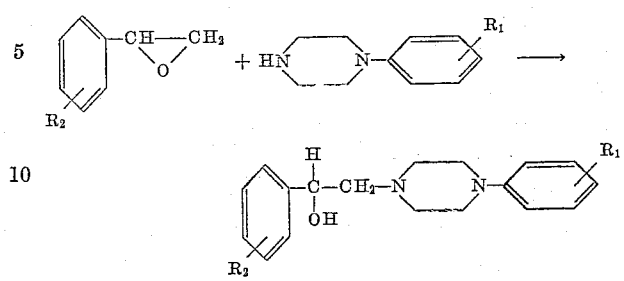

The alcohol, in turn is acetylated to yield the required compounds through use of acetic anhydride or acetyl chloride.

An additional route involves the condensation of the substituted phenylpiperazine with a phenacyl halide to give the ketone which, in turn is reduced to the alcohol with sodium borohydride or by means of catalytic hydrogenation, as indicated in the equation below:

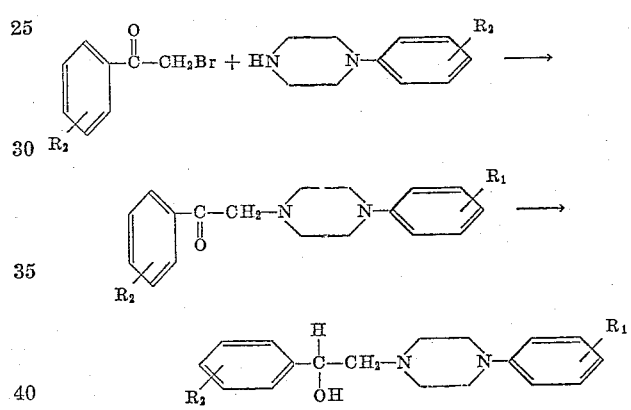

The alcohols, in turn, are acetylated as described above. In general, it was convenient to use the styrene oxide method for compounds where $R_2$ was hydrogen, and the phenacyl halide synthesis where $R_2$ was a substituent other than hydrogen.

Compounds typifying the syntheses involved and the nature of the products embodied by this invention are shown in the tables below.

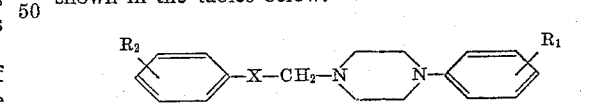

TABLE I

*Intermediate Reactant*

[Ketones X=—CO—]

| $R_2$ | M.P., °C., R.S.ᵃ or B.P., °C. (mm. pressure) | Percent yield | Formula | Analysis, percent |  |  |  |  |  |
|---|---|---|---|---|---|---|---|---|---|
|  |  |  |  | Carbon |  | Hydrogen |  | Nitrogen |  |
|  |  |  |  | Calc. | Found | Calc. | Found | Calc. | Found |
| p-Cl | 132–133 |  | $C_{18}H_{19}ClN_2O$ | 68.7 | 68.8 | 6.1 | 6.3 | 8.9 | 9.1 |
| p-Cl.HBr | 242–244 (A) | 61 | $C_{18}H_{20}BrClN_2O$ | 54.6 | 54.8 | 5.1 | 5.3 |  |  |
| p-Br | 139–140 |  | $C_{18}H_{19}BrN_2O$ |  |  |  |  | 7.8 | 7.8 |
| p-Br.HBr | 243–246 d. (A) | 50 | $C_{18}H_{20}Br_2N_2O$ | 49.1 | 48.9 | 4.6 | 4.6 | 6.4 | 6.1 |
| 2,4-diCH₃ | 110–111 | 29 | $C_{20}H_{24}N_2O$ | 77.9 | 78.1 | 7.8 | 7.6 | 9.1 | 9.1 |
| p-C₆H₅ | 196–198 (B) | 49 | $C_{24}H_{24}N_2O$ | 80.9 | 80.9 | 6.8 | 6.9 | 7.9 | 7.6 |

See footnotes at end of table III.

TABLE II

*Intermediate Reactant*

[Alcohols X= —CHOH—]

| $R_1$ | $R_2$ | M.P., °C. or B.P., °C. | Percent yield | Formula | Carbon Calc. | Carbon Found | Hydrogen Calc. | Hydrogen Found | Nitrogen Calc. | Nitrogen Found |
|---|---|---|---|---|---|---|---|---|---|---|
| $C_6H_5$— | H | 113 | 78 | $C_{18}H_{22}N_2O$ | 76.6 | 76.6 | 7.9 | 8.0 | | |
| $C_6H_5$—[b] | H | 184–185 | | $C_{18}H_{23}ClN_2O$ | | | | | 8.8 | 8.5 |
| $C_6H_5$— | p-Cl | 154–155 | 58 | $C_{18}H_{21}ClN_2O$ | 68.2 | 68.7 | 6.7 | 6.6 | 8.8 | 8.4 |
| $C_6H_5$— | p-Br | 160 | 56 | $C_{18}H_{21}BrN_2O$ | 59.8 | 59.8 | 5.9 | 6.1 | 7.8 | 7.3 |
| $C_6H_5$— | 2,4-diCH$_3$— | 139–140 | 74 | $C_{20}H_{26}N_2O$ | 77.4 | 77.3 | 8.4 | 8.4 | 9.0 | 9.0 |
| $C_6H_5$— | p-$C_6H_5$— | 180 (B) | 56 | $C_{24}H_{26}N_2O$ | 80.4 | 80.0 | 7.3 | 7.0 | 7.8 | 7.9 |
| $C_6H_5$—[c] | H | 109–110 (C) | 23 | $C_{19}H_{24}N_2O$ | 77.0 | 77.1 | 8.2 | 7.9 | 9.5 | 9.5 |
| o-$CH_3C_6H_4$— | H | 116–117 | 47 | $C_{19}H_{24}N_2O$ | | | | | 9.5 | 9.5 |
| m-$CH_3C_6H_4$— | H | 95–97 | 50 | $C_{19}H_{24}N_2O$ | 77.0 | 77.0 | 8.2 | 8.2 | 9.5 | 9.6 |
| p-$CH_3C_6H_4$— | H | 118–119 | 60 | $C_{19}H_{24}N_2O$ | 77.0 | 77.4 | 8.2 | 7.9 | 9.5 | 9.7 |
| o-$ClC_6H_4$— | H | 129–130 | 56 | $C_{18}H_{21}ClN_2O$ | | | | | 8.8 | 9.1 |
| m-$ClC_6H_4$— | H | 97 | 48 | $C_{18}H_{21}ClN_2O$ | | | | | 8.8 | 9.1 |
| p-$ClC_6H_4$— | H | 133–134 | 60 | $C_{18}H_{21}ClN_2O$ | | | | | 8.8 | 9.2 |
| o-$CH_3OC_6H_4$— | H | 196–201/0.01 | 80 | $C_{19}H_{24}N_2O_2$ | 73.0 | 73.0 | 7.7 | 7.3 | 9.0 | 9.1 |
| p-$CH_3OC_6H_4$— | H | 144 | 10 | $C_{19}H_{24}N_2O_2$ | | | | | 9.0 | 9.0 |

See footnotes at end of Table III.

TABLE III

*Final Product*

[ₒAcetates X= —CHOCOCH$_3$—ₒ]

| $R_1$ | $R_2$ | M.P., °C. or b.P. °C. | Percent yield | Formula | Carbon Calc. | Carbon Found | Hydrogen Calc. | Hydrogen Found | Nitrogen Calc. | Nitrogen Found |
|---|---|---|---|---|---|---|---|---|---|---|
| $C_6H_5$— | H | 113–115 (C) | 65 | $C_{20}H_{24}N_2O_2$ | 74.0 | 74.4 | 7.5 | 7.5 | 8.6 | 8.5 |
| $C_6H_5$—[d] | H | 132–134 (.005) | 70 | $C_{21}H_{26}N_2O_2$ | | | | | 8.3 | 8.2 |
| $C_6H_5$—[e] | H | 186–190 (0.05) | 50 | $C_{22}H_{28}N_2O_2$ | 75.0 | 75.4 | 8.0 | 8.1 | 8.0 | 7.8 |
| $C_6H_5$—[f] | H | 130–133 (D) | 36 | $C_{25}H_{27}ClN_2O_2$ | 70.9 | 70.6 | 6.6 | 6.4 | | |
| $C_6H_5$—[g] | H | 184–185 | 20 | $C_{19}H_{23}N_3O_2$ | 70.1 | 70.2 | 7.1 | 6.7 | 12.9 | 13.2 |
| $C_6H_5$—[h] | H | 126–127 (B) | 50 | $C_{21}H_{27}N_3O_2$ | 71.4 | 71.1 | 7.7 | 7.7 | 11.9 | 12.1 |
| $C_6H_5$— | p-Cl | 109–110 (C) | 57 | $C_{20}H_{23}ClN_2O_2$ | | | | | 7.8 | 7.9 |
| $C_6H_5$— | p-Br | 118–119 (C) | 72 | $C_{20}H_{23}BrN_2O_2$ | | | | | 7.0 | 7.4 |
| $C_6H_5$— | 2,4-diCH$_3$— | 100–101 (C) | 74 | $C_{22}H_{28}N_2O_2$ | 75.0 | 75.1 | 8.0 | 7.9 | 8.0 | 8.3 |
| $C_6H_5$—[e] | H | 68 (C) | 65 | $C_{21}H_{26}N_2O_2$ | 74.5 | 74.6 | 7.7 | 7.8 | 8.3 | 8.2 |
| o-$CH_3C_6H_4$— | H | 99–101 (C) | 50 | $C_{21}H_{26}N_2O_2$ | 74.5 | 74.1 | 7.7 | 7.5 | 8.3 | 8.4 |
| m-$CH_3C_6H_4$— | H | 109–110 (C) | 60 | $C_{21}H_{26}N_2O_2$ | | | | | 8.3 | 8.3 |
| p-$CH_3C_6H_4$— | H | 88–89 (C) | 78 | $C_{21}H_{26}N_2O_2$ | 74.5 | 74.8 | 7.7 | 7.6 | 8.3 | 8.2 |
| o-$ClC_6H_4$— | H | 90–91 (C) | 48 | $C_{20}H_{23}ClN_2O_2$ | | | | | 7.8 | 8.0 |
| m-$ClC_6H_4$— | H | 95–97 (C) | 60 | $C_{20}H_{23}ClN_2O_2$ | 66.9 | 67.0 | 6.5 | 6.5 | 7.8 | 8.0 |
| p-$ClC_6H_4$— | H | 123–124 (C) | 48 | $C_{20}H_{23}ClN_2O_2$ | 66.9 | 67.1 | 6.5 | 6.2 | 7.8 | 8.0 |
| o-$CH_3OC_6H_4$— | H | 200–206/0.005 | 57 | $C_{21}H_{26}N_2O_3$ | 71.2 | 71.6 | 7.4 | 7.6 | 7.9 | 7.9 |
| p-$CH_3OC_6H_4$— | H | 87–88 (C) | 66 | $C_{21}H_{26}N_2O_2$ | 71.2 | 70.8 | 7.4 | 7.2 | | |

[a] Melting points are not corrected and were determined on a Fisher-Johns melting point block. R.S.=Recrystallizing solvent Solid compounds were recrystallized from ethanol unless otherwise shown. A=methanol; B=acetonitrile; C=hexane; D=acetone.
[b] Hydrochloride of compound. [c] Reactant is 1-phenyl-2-methylpiperazine. [d] X=—CHOCOC$_2$H$_5$— [e] X=—CHOCOC$_3$H$_{7n}$— [f] X=—CHOCOC$_6$H$_5$—; compound isolated as hydrochloride. [g] X=—CHOCONH$_2$— [h] X=—CHOCONHC$_2$H$_5$—.

The preferred embodiment of this invention is directed especially to compounds wherein the $R_1$ group is unsubstituted or substituted as halogen and $R_2$ group is varied as hydrogen, methyl, and dimethyl.

Examples typifying the syntheses employed in the preparation of compounds of this invention which are in no sense limiting are given below; also presented is synthesis of typical intermediates, and closely related analogs of the compounds of this invention introduced for purposes of comparison.

EXAMPLE 1

*2-(4-Phenylpiperazinyl)-1-Phenylethanol*

A mixture of 37.7 g. (0.24 mole) of 1-phenylpiperazine and 19.2 g. (0.16 mole) of styrene oxide in 100 mls. of ethanol was maintained under reflux for 7 hours. After storage at 20° for 20 hours the formed precipitate was separated and recrystallized (ethanol) to give 34 g. (78%), M.P. 113°.

EXAMPLE 2

*2-(4-Phenylpiperazinyl)-1-Phenylethyl Acetate*

2-(4-phenylpiperazinyl)-1-phenylethanol (56.0 g., 0.2 mole) was added to a stirred solution of 44.0 g. (0.22 mole) of acetic anhydride and 16 g. (0.2 mole) of pyridine in 250 mls. of acetonitrile and the reaction mixture heated under reflux for 9 hours. After removal of volatiles at diminished pressure, the residue was granulated with cold dilute sodium hydroxide. The product was separated, dried, and recrystallized (hexane) to give 42 g. (65%), M.P. 113–115°.

Treatment of a methanol solution of the free base with a methanolic solution of an equivalent quantity of hydrogen chloride gave the title compound hydrochloride.

EXAMPLE 3

*2-(4-Phenylpiperazinyl)-1-Phenylethyl Propionate*

A mixture of 7.0 g. (0.025 mole) of 2-(4-phenylpiperazinyl)-1-phenylethanol, 6.5 g. (0.05 mole) of propionic anhydride and 25 mls. of acetonitrile was refluxed for 19 hours. After removal of solvent at diminished pressure, the residue was suspended in dilute aqueous sodium hydroxide and the product extracted with ether. After drying (magnesium sulfate) and evaporation of ether, the residue was distilled to give 5.4 g. (70%), B.P. 132–134° (0.005 mms.).

Example 4

2-(4-Phenylpiperazinyl)-1-Phenylethyl n-Butyrate

A mixture of 2-(4-phenylpiperazinyl)-1-phenylethanol (7.0 g., 0.025 mole), 7.6 g. (0.025 mole) of n-butyric anhydride and 50 mls. of acetonitrile were heated under reflux for 19 hours. The solvent was removed at diminished pressure, and the residue of product suspended in dilute sodium hydroxide and extracted into ether. After drying (magnesium sulfate), evaporation of solvent and distillation, there was obtained 4.4 g. (50%) of product, B.P. 186–190° (0.05 mms.).

Example 5

1-(4-Phenylpiperazinyl)-1-Phenylethyl Benzoate Hydrochloride

A cooled solution of 8.9 g. (0.03 mole) of 1-(4-phenylpiperazinyl)-1-phenylethanol in 25 mls. of acetonitrile was treated with 4.2 g. (0.03 mole) of benzoyl chloride. After 4 days at 20°, the product was separated and recrystallized (acetone) to give 4.5 g. (36%), M.P. 130–133°.

Example 6

2-(4-Phenylpiperazinyl)-1-Phenylethyl Carbamate

A cooled solution of 8.5 g. (0.03 mole) of 2-(4-phenylpiperazinyl)-1-phenylethanol in 20 mls. of pyridine was treated with 4.7 g. (0.03 mole) of phenyl chloroformate and stirred for 3 hours at 20°. After addition of 30 mls. of water, and extraction with ether, the ether phase was successively washed with saturated aqueous sodium bicarbonate and saturated aqueous sodium chloride and then dried (magnesium sulfate).

The dried ether solution was added dropwise, with stirring, to 300 mls. of liquid ammonia and stored 16 hours. After evaporation of the ammonia, the residue was treated with 100 mls. of ether and 50 mls. of water. The product was obtained upon evaporation of the ether phase, recrystallized (ethanol) to give 2.09 g. (20%), M.P. 184–185°.

Example 7

2-(4-Phenylpiperazinyl)-1-Phenylethyl-N-Ethylcarbamate

A mixture of 2-(4-phenylpiperazinyl)-1-phenylethanol (4.8 g., 0.017 mole) and 1.2 g. (0.017 mole) ethyl isocyanate was maintained under reflux in a bath at 125° for 1.25 hours. When cool, the formed product was recrystallized (acetonitrile) to give 3.0 g. (50%), M.P. 126–127°.

Example 8

1-(p-Chlorophenacyl)-4-Phenylpiperazine

A mixture of 25 g. (0.11 mole) of 2-bromo-4'-chloroacetophenone in 65 mls. of isopropyl alcohol was maintained at 65–70° during the addition of a solution of 17.8 g. (0.11 mole) of 1-phenylpiperazine in 35 mls. of isopropyl alcohol. After 15 minutes under reflux and cooling, the formed precipitate was separated to give 41 g. of product hydrobromide, melting at 225–228°.

Two recrystallizations from methanol yielded 21 g. (61%) of 1-(p-chlorophenacyl)-4-phenylpiperazine hydrobromide, M.P. 242–244° (d.).

Treatment of the hydrobromide with aqueous sodium hydroxide gave the product, recrystallized (ethanol), melted 132–133°.

Example 9

2-(4-Phenylpiperazinyl)-1-(p-Chlorophenyl)ethanol

Sodium borohydride (0.65 g., 0.017 mole) was added in small portions to a suspension of 11.9 g. (0.03 mole) of 1-(p-chlorophenacyl)-4-phenylpiperazine in 100 mls. of ethanol previously rendered basic with aqueous sodium hydroxide. After storage at 20° over 18 hours, the reaction mixture was acidified with 3 N hydrochloric acid and then made basic with aqueous sodium hydroxide. The formed product was separated and recrystallized (ethanol) to give 5.5 g. (58%), M.P. 154–155°.

Example 10

2(4-Phenylpiperazinyl)-1-(p-Chlorophenyl)Ethyl Acetate 2-(4-phenylpiperazinyl) - 1 - (p - chlorophenyl)ethanol (3.2 g., 0.01 mole), 20 g. (0.2 mole) of acetic anhydride and 25 mls. of acetonitrile were heated under reflux for 9 hours. After removal of solvent and excess anhydride at diminished pressure, the residue was recrystallized (hexane) to give 2.0 g. (57%) of product, M.P. 109–110°.

Example 11

2-[4-(o-Tolyl)Piperazinyl]-1-Phenylethanol

A solution of 9.6 g. (0.08 mole) of styrene oxide and 14.1 g. (0.08 mole) of 1-(o-tolyl)piperazine in 50 mls. of ethanol was heated under reflux for 9 hours. After removal of solvent and unreacted starting material at diminished pressure, the residue of product was recrystallized (ethanol) to give 11.0 g. (47%), melting at 116–117°.

Example 12

2-[4-(o-Tolyl)Piperazinyl]-1-Phenylethyl Acetate

A mixture of 4.5 g. (0.015 mole) of 2-[4-o-tolyl)-piperazinyl]-1-phenylethanol, 20 g. (0.2 mole) of acetic anhydride and 25 mls. of acetonitrile were heated under reflux for 9 hours. After removal of solid and excess acetic anhydride at diminished pressure, the residue was recrystallized (hexane) to give 2.5 g. (50%) of product, M.P. 99–101°.

Example 13

1-(2,4-Dimethylphenacyl)-4-Phenylpiperazine

A solution of 12.8 g. (0.08 mole) of 1-phenylpiperazine in 50 mls. of isopropyl alcohol was maintained at 65–70° during the addition of a solution of 14.6 g. (0.08 mole) of 2-chloro-2',4'-dimethylacetophenone in 100 mls. of isopropyl alcohol. After heating under reflux for 15 minutes and cooling, the formed precipitate was separated, suspended in cooled, dilute aqueous sodium hydroxide to precipitate the product which was recrystallized (ethanol) to give 7.0 g. (29%), M.P. 110–111°.

Anal.—Calcd. for $C_{20}H_{24}N_2O$: C, 77.9; H, 7.8; N, 9.1. Found: C, 78.1; H, 7.8; N, 9.1.

Example 14

2-(4-Phenylpiperazinyl)-1-(2,4-Dimethylphenyl)-Ethanol

Sodium borohydride (0.80 g., 0.021 mole) was added in small portions to 7 g. (0.022 mole) of 1-(2,4-dimethylphenacyl)-4-phenylpiperazine suspended in 70 mls. of ethanol, previously rendered basic with dilute aqueous sodium hydroxide. After storage at 20° for 18 hours, the mixture was acidified with dilute hydrochloric acid, and then made basic again with aqueous sodium hydroxide. Filtration of the solid and recrystallization from ethanol gave 5 g. of product (74%), M.P. 139–140°.

Example 15

2-(4-Phenylpiperazinyl)-1-(2,4-Dimethylphenyl)-Ethyl Acetate

2 - (4 - phenylpiperazinyl) - 1 - (2,4 - dimethylphenyl)-ethanol (3.1 g., 0.01 mole), 20 g. (0.2 mole) of acetic anhydride and 25 mls. of acetonitrile were heated under reflux for 8 hours. After evaporation of solvent and excess acetic anhydride, the residue was suspended in dilute sodium hydroxide, filtered, dried and recrystallized (hexane) to give 2.6 g. (74%) of product, M.P. 100–101°.

Upon addition of an equivalent of malic acid to a methanol solution of the product, the malic acid salt is obtained.

The compounds of this invention may be administered in the form of tablets and capsules containing from 5–50 mg. of the active ingredient prepared in the conventional manner or in sustained release forms, as well as elixirs, suspensions and other similar pharmaceutical dosage forms. For parenteral administration, the compounds desirably as their salts, may be incorporated in solution, in a non-toxic vehicle and sterilized, preferably by filtration. In addition, the compounds can be formulated as an inhalation aerosol or provided in a form for dispensing by atomizers, nebulizers, and similar devices.

To establish the effectiveness of the compounds of this invention, the following tests were employed.

Guinea pigs of either sex are selected on the basis of sensitivity (demonstrated by collapse) to exposure to aqueous 0.2% histamine aerosol under standard conditions for 3–5 minutes. Sensitive animals are allowed to recover for 2–4 hours. At the end of the recovery period, test compound is administered, either orally or subcutaneously, and 90 minutes later the pigs are re-exposed to the aerosol. Those pigs not collapsing in 5 minutes are considered protected. Six pigs are studied per dose level and the dosage level plotted against the percent of pigs protected, and the effective dose providing 50% protection ($ED_{50}$) is established.

In another test, fed and watered guinea pigs of either sex are selected on the basis of sensitivity (manifested by collapse in 5 minutes) to exposure to an aerosol of 1% acetylcholine bromide in saline at 5.8 lbs./in.$^2$ (300 mm. Hg) driving pressure in a suitable chamber. Sensitive animals are allowed to recover for 2–4 hours. At the end of this time, test drug is administered by the desired route and 90 minutes later the pigs are re-exposed to acetylcholine bromide aerosol in the chamber under the standardized conditions. Those pigs which do not collapse within 5 minutes are considered protected. Six pigs are studied per dose level, and results are established as described for the histamine test.

Whereas such procedures established the potent bronchodilator activity of the compounds, a variety of standard procedures showed that compounds of this invention were relatively non-toxic, and without the undesirable cardiovascular, and central nervous system side effects.

It is to be understood that the invention is not to be limited to the exact details of operation or exact compounds shown and described as obvious modifications and equivalents will be apparent to one skilled in the art and the invention is, therefore, to be limited only by the scope of the appended claims.

We claim:
1. The compound of the formula

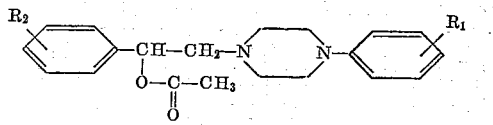

wherein $R_1$ and $R_2$ are selected from the group consisting of hydrogen, lower alkyl, lower alkoxy, phenyl, and halogen.

2. The compound

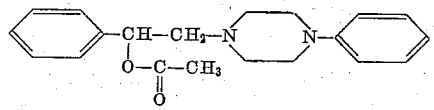

3. The compound

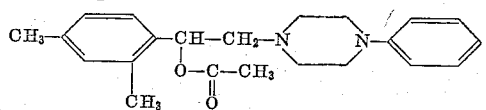

4. The compound

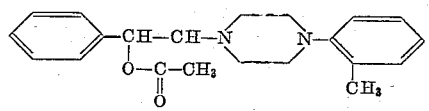

5. The compound

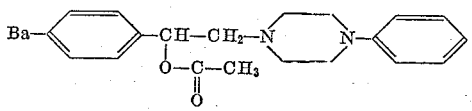

6. The compound

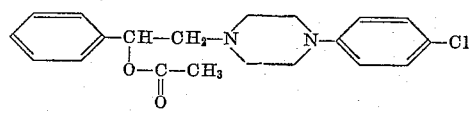

7. Nontoxic acid salts of the compounds of claim 1.
8. Quaternary ammonium salts of the compounds of claim 1.

References Cited in the file of this patent

UNITED STATES PATENTS

| | | |
|---|---|---|
| 2,849,306 | Searle | Aug. 26, 1958 |
| 2,854,470 | Jacob et al. | Sept. 30, 1958 |
| 2,945,860 | Schmidt et al. | July 19, 1960 |

FOREIGN PATENTS

| | | |
|---|---|---|
| 332,664 | Switzerland | Oct. 31, 1958 |

OTHER REFERENCES

Hampton et al.: Am. Chem. Soc. Jour., vol. 59, pp. 2570–2572 (1937).